United States Patent
Maekawa et al.

(10) Patent No.: US 9,487,658 B2
(45) Date of Patent: Nov. 8, 2016

(54) COPPER PHTHALOCYANINE PIGMENT AND METHOD FOR PRODUCING COPPER PHTHALOCYANINE MICROPARTICLES

(75) Inventors: Masaki Maekawa, Izumi (JP); Daisuke Honda, Izumi (JP); Masakazu Enomura, Izumi (JP)

(73) Assignee: M. TECHNIQUE CO., LTD., Izumi-Shi (JP)

( * ) Notice: Subject to any disclaimer, the term of this patent is extended or adjusted under 35 U.S.C. 154(b) by 69 days.

(21) Appl. No.: 13/701,162

(22) PCT Filed: Mar. 4, 2011

(86) PCT No.: PCT/JP2011/055064
§ 371 (c)(1),
(2), (4) Date: Nov. 30, 2012

(87) PCT Pub. No.: WO2011/152095
PCT Pub. Date: Dec. 8, 2011

(65) Prior Publication Data
US 2013/0071664 A1    Mar. 21, 2013

(30) Foreign Application Priority Data
Jun. 3, 2010  (JP) .................. 2010-127793

(51) Int. Cl.
C09B 47/04    (2006.01)
C09B 67/50    (2006.01)
(Continued)

(52) U.S. Cl.
CPC ....... *C09B 67/0026* (2013.01); *C09B 67/0019* (2013.01); *Y10T 428/2982* (2015.01)

(58) Field of Classification Search
None
See application file for complete search history.

(56) References Cited

U.S. PATENT DOCUMENTS 5,281,268 A * 1/1994 Ide .................. C09B 67/0023
                                                        106/410
2010/0326321 A1  12/2010 Enomura

FOREIGN PATENT DOCUMENTS

CN       1207354 C      6/2005
CN     101522827 A      9/2009
EP       2060608 A1     5/2009
(Continued)

OTHER PUBLICATIONS

Machine Translation of JP 2002-189119 A.*
(Continued)

*Primary Examiner* — Ronak Patel
*Assistant Examiner* — Thomas Mangohig
(74) *Attorney, Agent, or Firm* — Birch, Stewart, Kolasch & Birch, LLP

(57) ABSTRACT

Provided are: a copper phthalocyanine pigment which contains at least one kind of copper phthalocyanine microparticles whose crystal type is any of two kinds of β- and γ-type crystals and that exhibits, in a region of 380 nm to 780 nm, an absorption spectrum shape extremely similar to that of α-form copper phthalocyanine microparticles; and a process for the production of the copper phthalocyanine microparticles. Also provided are: a copper phthalocyanine pigment which contains at least one kind of coper phthalocyanine microparticles whose crystal type is any of two kinds of β- and γ-type crystals and that exhibits a wavelength (λ-max) of shorter than 478 nm in the transmission spectrum in a region of 380 nm to 780 nm, said wavelength (λ-max) being a wavelength at which the maximum transmittance appears; and a process for the production of the copper phthalocyanine microparticles.

11 Claims, 9 Drawing Sheets

(51) Int. Cl.
*C09B 67/16* (2006.01)
*B82B 1/00* (2006.01)

(56) References Cited

FOREIGN PATENT DOCUMENTS

| | | | | |
|---|---|---|---|---|
| EP | 2184109 | A1 | 5/2010 | |
| GB | 1411880 | A | 10/1975 | |
| JP | 2002-189119 | A * | 4/2002 | ............... G02B 5/20 |
| JP | 2002-189119 | A * | 7/2002 | |
| JP | 2003-313456 | A | 11/2003 | |
| JP | 2004-252443 | A | 9/2004 | |
| JP | 2006-341232 | A | 12/2006 | |
| JP | 2007-332317 | A | 12/2007 | |
| JP | 2008-208277 | A | 9/2008 | |
| JP | 2009-242785 | A | 10/2009 | |
| WO | WO 2008/095801 | A2 | 8/2008 | |
| WO | WO 2009/008388 | A1 | 1/2009 | |
| WO | WO 2010/035861 | A1 | 4/2010 | |

OTHER PUBLICATIONS

Achar et al., "Studies on polymorphic modifications of copper phthalocyanine," Journal of Solid State Chemistry, vol. 177, 2004, pp. 1987-1993, XP002674157.
Engel et al., "Single-Crystal and Solid-State Molecular Structures of Phthalocyanine Complexes," The Porphyrin Handbook, vol. 20 (vol. Date 1996), 1997, 11-54, 52 pages.
Chinese Office Action and Search Report dated Oct. 18, 2013 for Application No. 201180016024.0.

* cited by examiner (A)

(B)

(A)

(B)

COPPER PHTHALOCYANINE PIGMENT AND METHOD FOR PRODUCING COPPER PHTHALOCYANINE MICROPARTICLES

TECHNICAL FIELD

The present invention relates to a novel copper phthalocyanine pigment.

BACKGROUND ART

A copper phthalocyanine is an organic pigment of a blue or a cyan color widely used in a coating material, an ink jet ink, a color filter, a toner, and so on. A metal-free phthalocyanine having central copper replaced with hydrogens in its molecular structure and many kinds of metal phthalocyanine having central copper replaced with other metal elements in its molecular structure have been synthesized; however, among them, a copper phthalocyanine is largest in its industrial use because it is excellent not only in color characteristics such as a coloring power and a color-producing power as a color material but also in water resistance, heat resistance, and durability such as light resistance and weatherability. A copper phthalocyanine is also used for a semiconductor, a catalyst, a sensor, and so on, in addition to the organic pigment and the color material as mentioned above, so that this compound is also considered to become an important material from now on.

A copper phthalocyanine has many crystal polymorphisms such as $\alpha$, $\beta$, $\gamma$, $\epsilon$, $\pi$, $\chi$, $\sigma$, and $\rho$; and it is said that a copper phthalocyanine is different in physical properties such as color characteristics and solvent resistance depending on its crystal type. However, color characteristics of a copper phthalocyanine is significantly influenced not only by its crystal type but also by a diameter of its primary particles and degree of agglomeration during its use, in other words, it is also influenced by a diameter of dispersed particles; and thus, a producing method in accordance with the intended crystal type thereof is required, so that many methods for controlling the crystal type and for producing microparticles have been reported.

As to the production method of, for example, the $\beta$- or the $\epsilon$-type copper phthalocyanine, reported are: a solvent method in which treatment thereof is done with specific organic solvents such as those described in Patent Document 1; and a so-called solvent milling method and solvent salt milling method in which treatment with beads or an inorganic salt is done in specific solvents such as those described in Patent Document 2.

However, in the solvent method, control of formation of large particles due to crystal growth is difficult; and in the solvent milling method and the solvent salt milling method, crystal growth and crushing of crystals occur in parallel, so that there have been problems of not only requiring large energy but also not expressing characteristics expected as pigment nanoparticles, such as color tone, transparency, spectroscopic characteristics, and durability, because a strong force is applied to the copper phthalocyanine.

The Applicant of the present invention proposed, in Patent Document 3, a copper phthalocyanine pigment and a method for producing the same, wherein the copper phthalocyanine pigment contains a novel copper phthalocyanine having the $\alpha$-type crystal structure with a wavelength ($\lambda$max) to give the maximum transmittance in 380 nm to 780 nm of its transmission spectrum being shorter than 478 nm. The copper phthalocyanine shown in Patent Document 3 has excellent transmission characteristics and can transmit light of a specific wavelength range, while the transmittance thereof is higher than ever. In addition, in its absorption spectrum characteristics, its absorbance is higher as compared with a general copper phthalocyanine even if its dispersion solution thereof has the same concentration as the latter; and thus, it can be assumed that a coloring power thereof is better as compared with existing copper phthalocyanine pigments. However, there has been a problem that the $\alpha$-type crystal thereof, which is generally considered to be quasi-stable, grows in a certain solvent especially when attempt is made to use it in an aromatic organic solvent thereby not expressing its color characteristics; and thus, a stable or a quasi-stable copper phthalocyanine which has spectroscopic characteristics as shown in the Patent Document 3, while the crystal type thereof is different from the $\alpha$-type crystal, has been wanted.

Patent Document 1: Japanese Patent Laid-Open Publication No. 2003-313456
Patent Document 2: Japanese Patent Laid-Open Publication No. 2007-332317
Patent Document 3: International Patent Laid-Open Publication No. 2010/035861

DISCLOSURE OF INVENTION

Problems to be Solved by the Invention

In view of the above, the problems to be solved by the present invention are: to provide a copper phthalocyanine pigment containing at least one kind of copper phthalocyanine microparticle whose crystal type is different from an $\alpha$-type crystal while absorption spectrum thereof in 380 nm to 780 nm is of an absorption spectrum form of the $\alpha$-type crystal; and to provide a method for producing the said copper phthalocyanine microparticle.

Further problems to be solved are: to provide a copper phthalocyanine pigment containing at least one kind of copper phthalocyanine microparticle whose crystal type is different from two kinds of $\alpha$-type crystal and $\epsilon$-type crystal with the wavelength ($\lambda$max) to give the maximum transmittance in 380 nm to 780 nm of its transmission spectrum being shorter than 478 nm; and to provide a method for producing the said copper phthalocyanine microparticle.

Means for Solving the Problems

To solve the problems mentioned above, a first embodiment of the present invention is a copper phthalocyanine pigment containing at least one kind of copper phthalocyanine microparticle whose crystal type is different from an $\alpha$-type crystal, while absorption spectrum thereof in 380 nm to 780 nm is an absorption spectrum form of an $\alpha$-type crystal.

A second embodiment of the present invention is a copper phthalocyanine pigment containing at least one kind of copper phthalocyanine microparticle whose crystal type is different from an $\alpha$-type crystal, while a peak of an absorption spectrum thereof in 380 nm to 780 nm is in the range of 600 nm±15 nm to 680 nm±15 nm.

A third embodiment of the present invention is the copper phthalocyanine pigment containing at least one kind of copper phthalocyanine microparticle according to the first or the second embodiment of the present invention characterized in that the copper phthalocyanine pigment contains at least one kind of copper phthalocyanine microparticle whose crystal type is any of three kinds of $\beta$-, $\gamma$-, and $\epsilon$-type crystals, different from an $\alpha$-type crystal.

A fourth embodiment of the present invention is a copper phthalocyanine pigment containing at least one kind of copper phthalocyanine microparticle whose crystal type is different from two kinds of α-type and ε-type crystals, while a wavelength (λmax) to give the maximum transmittance in 380 nm to 780 nm of its transmission spectrum is shorter than 478 nm.

A fifth embodiment of the present invention is the copper phthalocyanine pigment containing at least one kind of copper phthalocyanine microparticle according to the fourth embodiment of the present invention characterized in that the copper phthalocyanine pigment contains at least one kind of copper phthalocyanine microparticle whose crystal type is any of two kinds of β- and γ-type crystals, different from two kinds of α-type crystal and ε-type crystal.

A sixth embodiment of the present invention is the copper phthalocyanine pigment containing copper phthalocyanine microparticles according to any of the first, second and fourth embodiments of the present invention, characterized in that the copper phthalocyanine microparticles are formed by a process comprising:

a fluid to be processed is supplied between processing surfaces being capable of approaching to and separating from each other and displacing relative to each other, pressure of force to move in the direction of approaching, including supply pressure of the fluid to be processed and pressure applied between the rotating processing surfaces, is balanced with pressure of force to move in the direction of separation thereby keeping a minute space in the distance between the processing surfaces, the minute space kept between two processing surfaces is used as a flow path of the fluid to be processed, thereby forming a thin film fluid of the fluid to be processed, and the microparticles thereof are formed in this thin film fluid.

A seventh embodiment of the present invention is the copper phthalocyanine pigment containing copper phthalocyanine microparticles according to any one of the first, second and fourth embodiments of the present invention, characterized in that form of the copper phthalocyanine microparticles is almost spherical.

A eighth embodiment of the present invention is the copper phthalocyanine pigment containing copper phthalocyanine microparticles according to the seventh embodiment of the present invention, characterized in that a volume-average particle diameter of the copper phthalocyanine microparticles is in the range of 1 nm to 600 nm.

A ninth embodiment of the present invention is a method for producing copper phthalocyanine microparticles, the method to produce the copper phthalocyanine microparticles according to any of the first, second and fourth embodiments of the present invention, characterized in that:

a fluid to be processed is supplied between processing surfaces being capable of approaching to and separating from each other and displacing relative to each other, pressure of force to move in the direction of approaching, including supply pressure of the fluid to be processed and pressure applied between the rotating processing surfaces, is balanced with pressure of force to move in the direction of separation thereby keeping a minute space in the distance between the processing surfaces, the minute space kept between two processing surfaces is used as a flow path of the fluid to be processed, thereby forming a thin film fluid of the fluid to be processed, and the copper phthalocyanine microparticle is separated in this thin film fluid.

A tenth embodiment of the present invention is the method for producing copper phthalocyanine microparticles according to the ninth embodiment of the present invention, characterized in that:

at least two fluids to be processed are used, at least one of the fluids to be processed is a copper phthalocyanine solution having a copper phthalocyanine dissolved in a solvent, and at least one of the fluids to be processed other than the above fluid is a solvent capable of being a poor solvent to the copper phthalocyanine, at least one of the fluids to be processed out of the copper phthalocyanine solution and the solvent capable of being a poor solvent to the copper phthalocyanine contains at least one kind of organic solvent, and the fluids to be processed are mixed in the thin film fluid.

An eleventh embodiment of the present invention is the method for producing copper phthalocyanine microparticles according to the ninth embodiment of the present invention, characterized in that:

at least three fluids to be processed, comprising a first fluid, a second fluid, and a third fluid, are used, wherein the first fluid to be processed is a copper phthalocyanine solution having a copper phthalocyanine dissolved in a solvent, the second fluid to be processed is a solvent capable of being a poor solvent to the copper phthalocyanine, and the third fluid to be processed contains at least one kind of organic solvent, wherein all of the fluids to be processed are mixed in the thin film fluid.

A twelfth embodiment of the present invention is the method for producing copper phthalocyanine microparticles according to the tenth or the eleventh embodiment of the present invention, characterized in that the organic solvent contains at least one solvent out of an aromatic compound solvent, a ketone compound solvent, an ether compound solvent, and a halogenated compound solvent.

A thirteenth embodiment of the present invention is the method for producing copper phthalocyanine microparticles according to the ninth embodiment of the present invention, characterized in that the method comprises:

a fluid pressure imparting mechanism for imparting a pressure to the fluid to be processed, at least two processing members of a first processing member and a second processing member, the second processing member being capable of relatively approaching to and separating from the first processing member, and a rotation drive mechanism for rotating the first processing member and the second processing member relative to each other; wherein each of the processing members is provided with at least two processing surfaces of a first processing surface and a second processing surface disposed in a position they are faced with each other, each of the processing surfaces constitutes part of a sealed flow path through which the fluid to be processed under the pressure is passed, of the first and second processing members, at least the second processing member is provided with a pressure-receiving surface, and at least part of the pressure-receiving surface is comprised of the second processing surface, the pressure-receiving surface receives pressure applied to the fluid to be processed by the fluid pressure imparting mechanism thereby generating force to move in the direction of separating the second processing surface from the first processing surface, the fluid to be processed under the pressure is passed between the first and second processing surfaces being capable of approaching to and separating from each other and rotating relative to each other, whereby the fluid to be processed forms the thin film fluid, and the copper phthalocyanine microparticles are separated in this thin film fluid.

A fourteenth embodiment of the present invention is the method for producing copper phthalocyanine microparticles according to the thirteenth embodiment of the present invention, characterized in that:

one kind of fluid to be processed is introduced to between the first processing surface and the second processing surface, an another independent introduction path for another kind of fluid to be processed other than the one kind of the fluid to be processed is provided, at least one opening leading to this introduction path is arranged in at least either one of the first processing surface or the second processing surface, the another kind of the fluid to be processed is introduced between both the processing surfaces through this introduction path, and the one kind of the fluid to be processed and the another kind of the fluid to be processed are mixed in the thin film fluid.

A fifteen embodiment of the present invention is the method for producing copper phthalocyanine microparticles according to the fourteenth embodiment of the present invention, characterized in that:

the opening is arranged in the downstream side of the point at which the one kind of the fluid to be processed becomes a laminar flow between both the processing surfaces, and mixing of the fluids to be processed is done by introducing the another kind of the fluid to be processed from the opening.

Advantages

According to the present invention, a copper phthalocyanine pigment containing at least one kind of a copper phthalocyanine microparticle whose crystal type is different from the α-type crystal while absorption spectrum thereof in 380 nm to 780 nm is of an absorption spectrum form of the α-type crystal, and a method for producing the said copper phthalocyanine microparticle could be provided. Therefore, a large energy is not necessary to change the crystal type thereof so that the problems mentioned above could be remedied.

Especially according to the fourth and the fifth embodiments, a copper phthalocyanine pigment containing at least one kind of copper phthalocyanine microparticle whose crystal type is different from two kinds of the α-type crystal and the ε-type crystal in powder X-ray diffraction measurement, especially the crystal type thereof being any of two kinds of the β- and the γ-type crystals with the wavelength (λmax) to give the maximum transmittance in 380 nm to 780 nm of its transmission spectrum being shorter than 478 nm could be provided. Namely, the copper phthalocyanine having spectroscopic characteristics provided in the Patent Document 3 filed by the Applicant of the present invention could be provided as a crystal type having higher solvent resistance than the α-type crystal.

MODE FOR CARRYING OUT THE INVENTION

Figure 4:
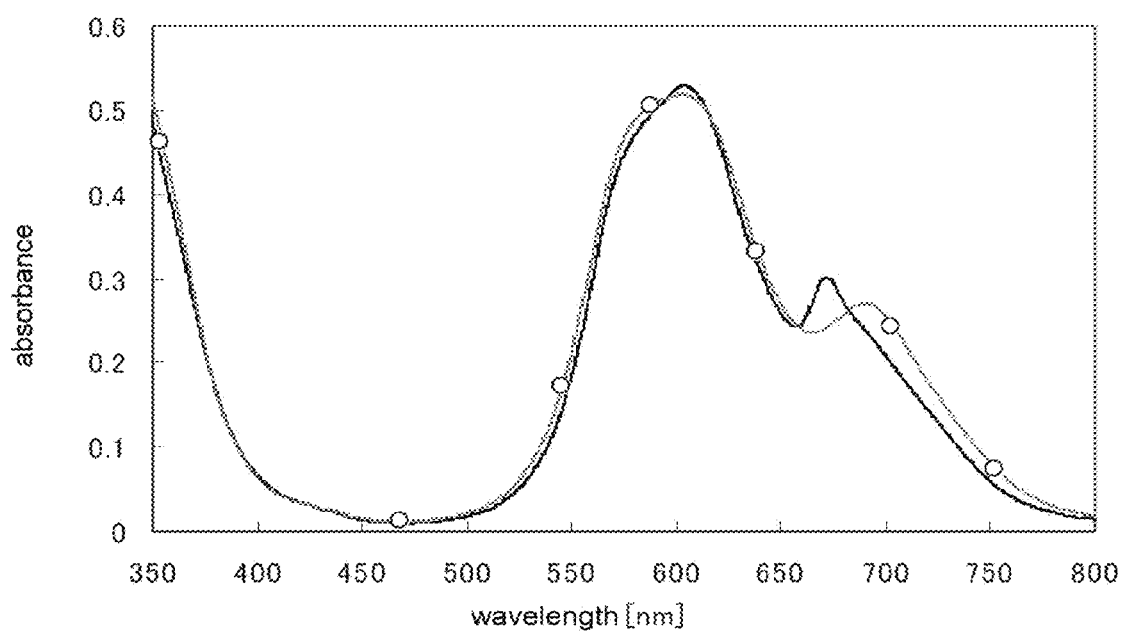
FIG. 4 shows an absorption spectrum of a dispersion solution of the copper phthalocyanine microparticles prepared in Example 1 of the present invention (this is shown by a solid line) and an absorption spectrum of the copper phthalocyanine pigment, which is provided in Patent Document 3, containing a copper phthalocyanine with the α-type crystal and with the wavelength (λmax) to give the maximum transmittance in 380 nm to 780 nm of its transmission spectrum being shorter than 478 nm (this is shown by a solid line with open circles).
Figure 5:
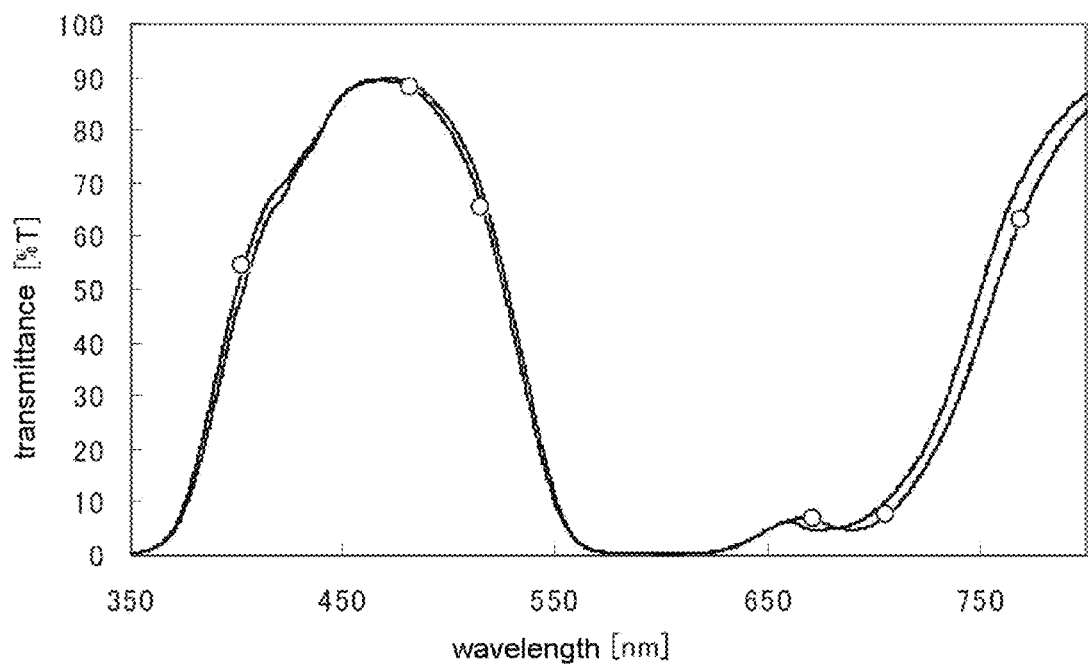
FIG. 5 shows a transmission spectrum of a dispersion solution of the copper phthalocyanine microparticles prepared in Example 1 of the present invention (this is shown by a solid line) and a transmission spectrum of the copper phthalocyanine pigment, which is provided in Patent Document 3, containing a copper phthalocyanine with the α-type crystal and with the wavelength (λmax) to give the maximum transmittance in 380 nm to 780 nm of its transmission spectrum being shorter than 478 nm (this is shown by a solid line with open circles).

The present invention is a copper phthalocyanine pigment containing a copper phthalocyanine microparticle whose crystal type is different from the α-type crystal shown by a powder X-ray diffraction chart, especially a copper phthalocyanine microparticle whose crystal type is any of three kinds of the β- (FIG. 6), the γ- (FIG. 7), and the ε-type crystals (FIG. 8), and containing at least one kind of a copper phthalocyanine microparticle shown by the solid line in the absorption spectrum of FIG. 4 and by the solid line in the transmission spectrum of FIG. 5. The copper phthalocyanine pigment of the present invention includes a phthalocyanine derivative such as a sulfonated and a hydroxylated copper phthalocyanine microparticle. Further, a copper phthalocyanine pigment introduced with a functional group such as a hydroxyl group or a sulfo group on a surface of the copper phthalocyanine microparticle may be included for use. In addition, the copper phthalocyanine pigment of the present invention may contain copper phthalocyanine microparticles having a plurality of crystal types different from the α-type crystal.

Figure 6:
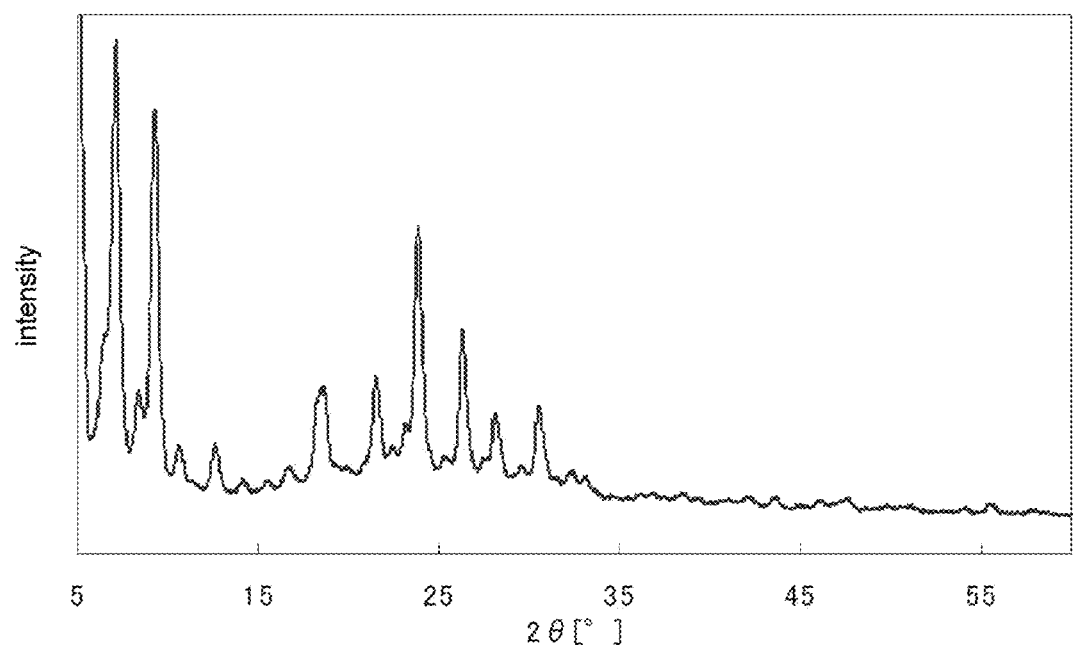
FIG. 6 shows a powder X-ray diffraction spectrum of the copper phthalocyanine microparticles prepared in Example 1 of the present invention.
Figure 7:
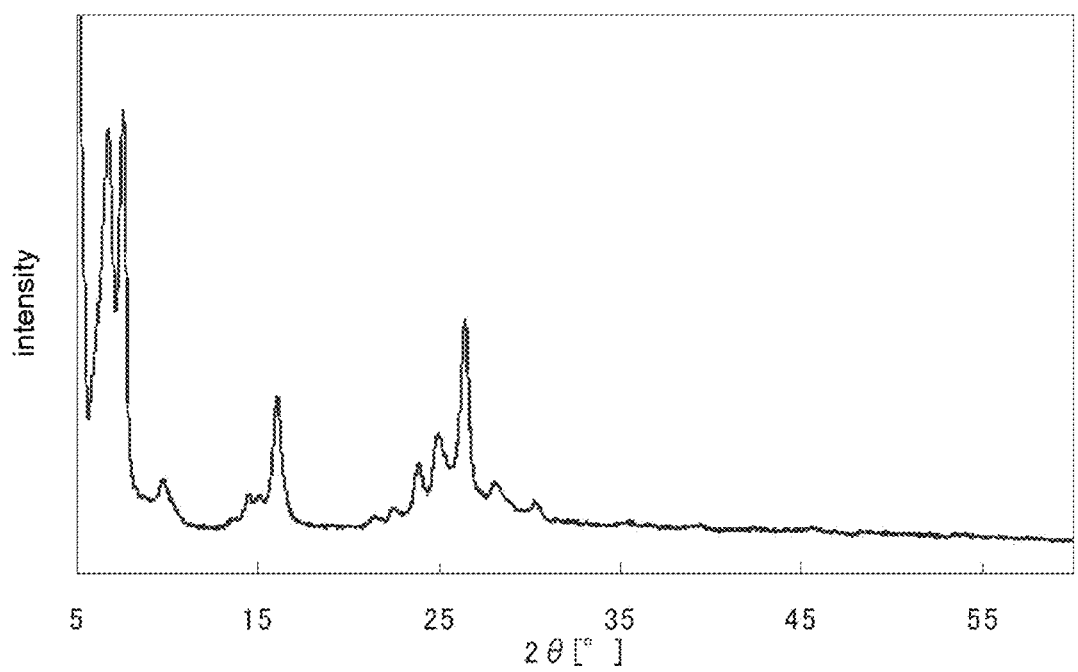
FIG. 7 shows a powder X-ray diffraction spectrum of the copper phthalocyanine microparticles prepared in Example 6 of the present invention.
Figure 8:
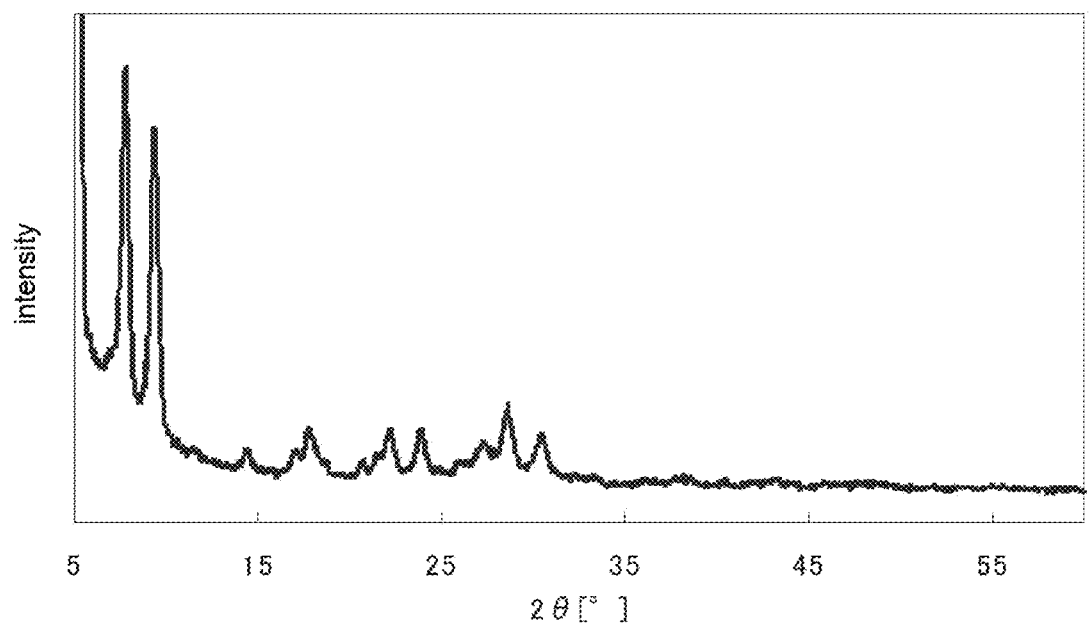
FIG. 8 shows a powder X-ray diffraction spectrum of the copper phthalocyanine microparticles prepared in Example 5 of the present invention.

As can be seen in FIG. 6 to FIG. 8, because the diffraction angles giving diffraction intensity peaks in the powder X-ray diffraction spectrum coincide with those of the copper phthalocyanine of respective crystal types (the β-type (stable type) in FIG. 6, the γ-type in FIG. 7, and the ε-type in FIG. 8), a crystal type of the copper phthalocyanine of the present invention can be judged to be different from the α-type crystal; and in addition, as shown in the absorption spectrum shown by the solid line in FIG. 4, it can be seen that the absorption spectrum in 380 nm to 780 nm is of an absorption spectrum form of the α-type copper phthalocyanine. In the copper phthalocyanine of the present invention, that an absorption spectrum thereof is of the α-type means that the absorption spectrum thereof has its peak in the range of 600±15 nm to 680±15 nm in the wavelength range of 380 nm to 780 nm. Further, as shown in the transmission spectrum shown by the solid line in FIG. 5, it can be seen that the copper phthalocyanine has the wavelength (λmax) to give the maximum transmittance of its transmission spectrum in 380 nm and 780 nm being shorter than 478 nm. A measurement method of the absorption spectrum or the transmission spectrum in the present invention is not particularly limited. Therefore, the measurement method includes, for example, a method in which the absorption or transmission spectrum of a copper phthalocyanine pigment is measured as to its dispersion solution in an aqueous medium or in an organic solvent, and a method in which the measurements are done after it is applied on a glass, a transparent electrode, or a film. Both spectra shown by the solid line with open circles in FIG. 4 and FIG. 5 are the absorption spectrum and the transmission spectrum, respectively, of the copper phthalocyanine pigment provided in the Patent Document 3 by the Applicant of the present invention and containing the copper phthalocyanine whose crystal type is the α-type with the wavelength (λmax) to give the maximum transmittance in 380 nm and 780 nm of its transmission spectrum being shorter than 478 nm; and thus, it can be seen that the forms thereof are almost identical to the absorption and transmission spectra of the copper phthalocyanine microparticle of the present invention.

The method for producing of the copper phthalocyanine pigment obtained by the present invention is not particularly restricted. A build-up method as well as a break-down method represented by a crushing method may be used. Alternatively, a new synthesis method may be used.

As one example of the method for producing the copper phthalocyanine pigment of the present invention, in the method for producing copper phthalocyanine microparticles by mixing a fluid which contains a copper phthalocyanine solution having a copper phthalocyanine dissolved in a solvent with a fluid which contains a solvent capable of being a poor solvent to the copper phthalocyanine whereby separating the copper phthalocyanine, the method characterized in that each of the foregoing fluids are mixed in a thin film fluid formed between processing surfaces being capable of relatively approaching to and separating from each other and disposed in a position they are faced with each other, wherein at least one of the surfaces rotates relative to the other surface, thereby separating the copper phthalocyanine microparticles in the thin film fluid may be used. Hereinafter, this production method will be explained. However, this production method is a mere one example, and thus, the present invention is not limited to this production method. Meanwhile, a crystal type of the copper phthalocyanine before dissolving into the afore-mentioned solvent is not particularly restricted; and thus, not only typical crystal types of the α-type, the β-type, and the ε-type, but also various crystal types of the copper phthalocyanine may be used. In addition, a copper phthalocyanine before the step to make it a pigment and a copper phthalocyanine containing an amorphous copper phthalocyanine may be used. A particle diameter thereof is not particularly limited, either.

Hereinbelow, a fluid processing apparatus usable in this method will be explained.

Figure 1:
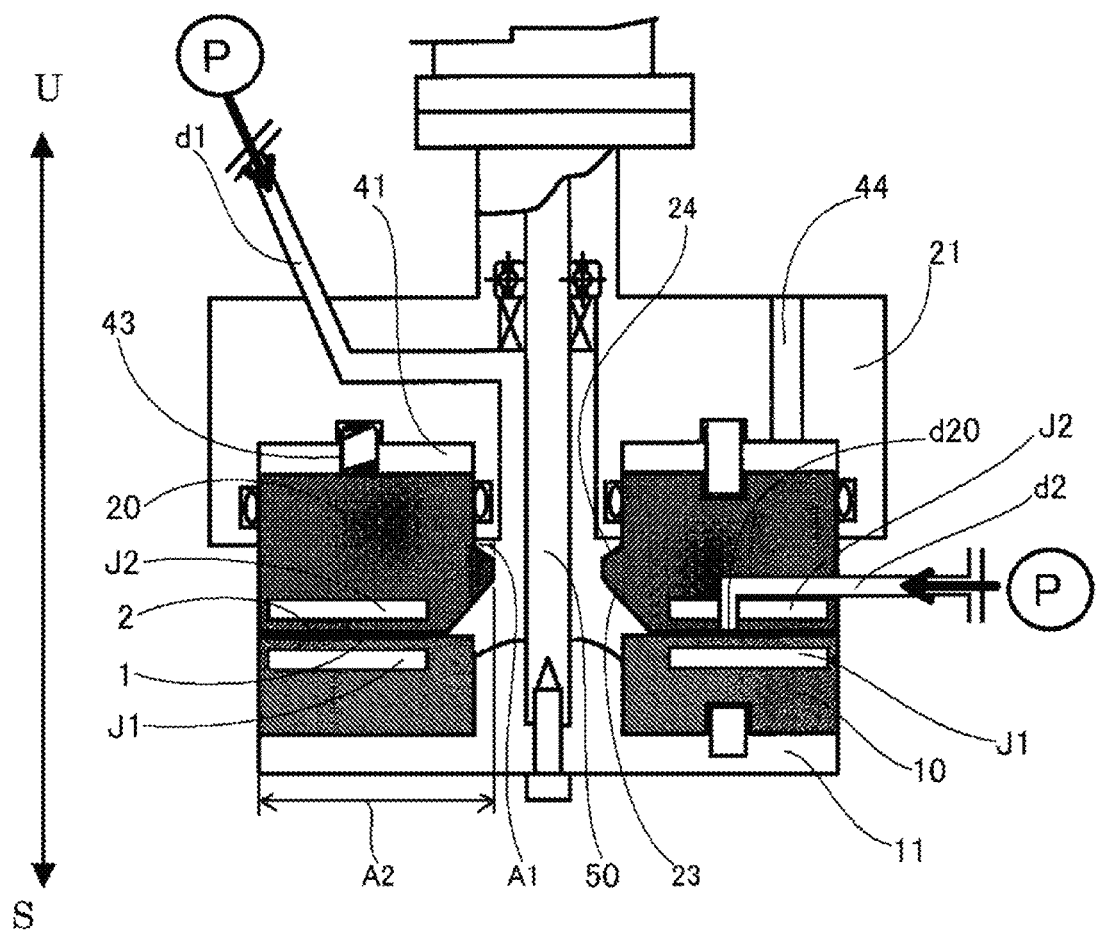
FIG. 1 is a schematic sectional view showing the fluid processing apparatus according to an embodiment of the present invention.
Figure 2:
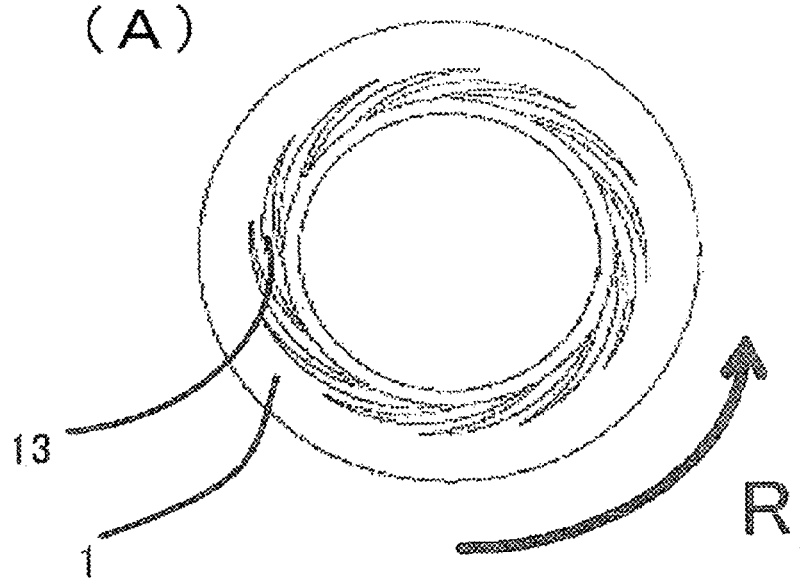
FIG. 2(A) is a schematic plane view of the first processing surface in the fluid processing apparatus shown in FIG. 1.
FIG. 2(B) is an enlarged view showing an important part of the processing surface in the apparatus.
Figure 2:
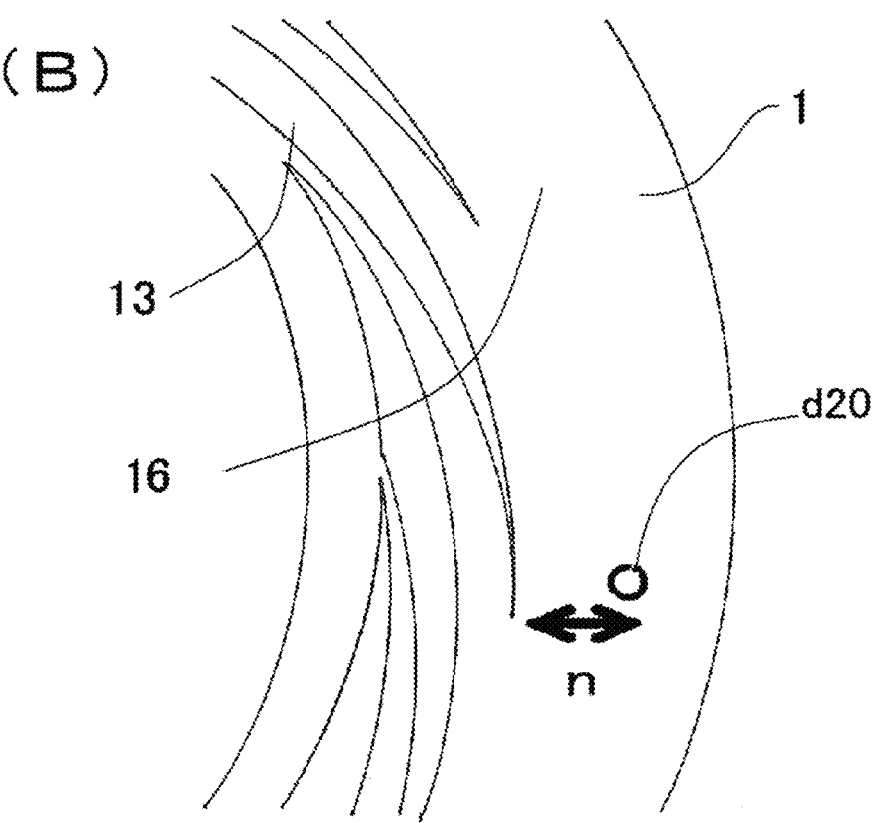
Figure 3:
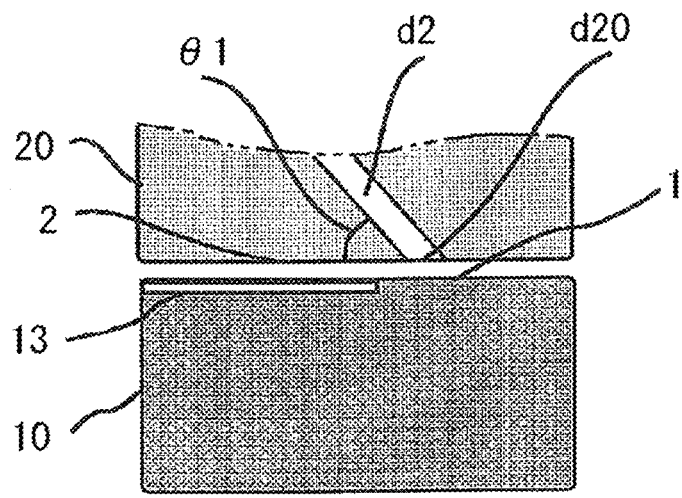
FIG. 3(A) is a sectional view of the second introduction path of the apparatus.
FIG. 3(B) is an enlarged view showing an important part of the processing surface for explaining the second introduction path.
Figure 3:
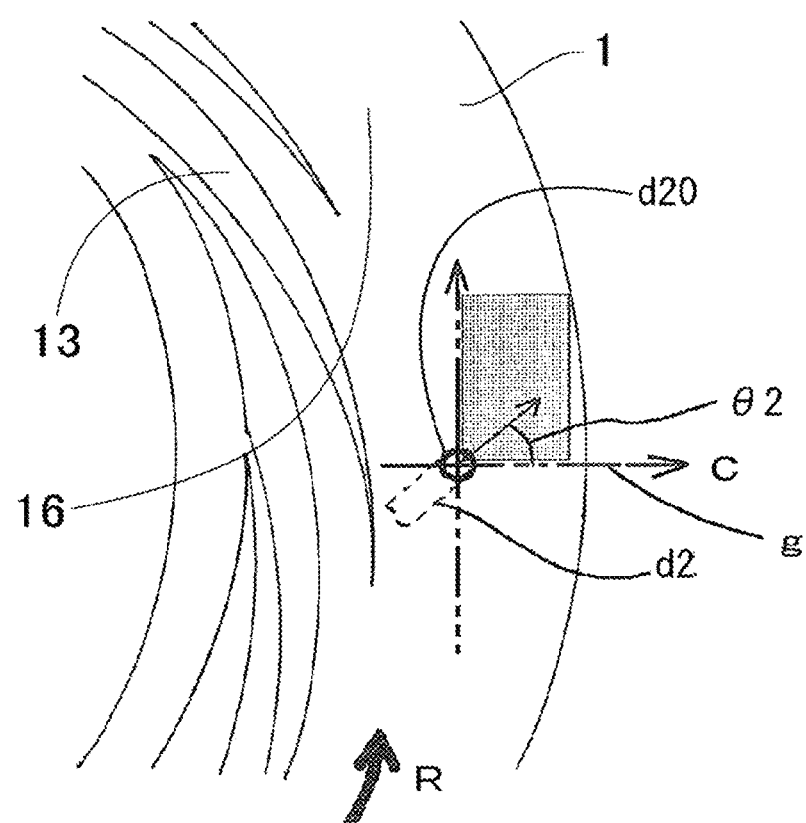

The fluid processing apparatus shown in FIG. 1 to FIG. 3 is similar to the apparatus described in Patent Document 3, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the afore-mentioned first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, frond and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids to be processed are used as the fluid to be processed, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually less than 1 mm, for example, in the range of about 0.1 μm to about 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive member, a first introduction part d1, a second introduction part d2, and a fluid pressure imparting mechanism p.

As shown in FIG. 2(A), in this embodiment, the first processing member 10 is a circular body, or more specifically a disk with a ring form. Similarly, the second processing member 20 is a disk with a ring form. A material of the processing members 10 and 20 is not only metal but also ceramics, sintered metal, abrasion-resistant steel, sapphire, other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both of the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to deviate the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2 under the state that pressure is applied thereto by a fluid pressure imparting mechanism p consisting of various pumps, potential energy, and so on. In this embodiment, the first introduction part d1 is a flow path arranged in the center of the circular second holder 21, and one end thereof is introduced into between the processing surfaces 1 and 2 from inside the circular processing members 10 and 20. Through the second introduction part d2, the second fluid to be processed for reaction to the first fluid to be processed is introduced into between the processing surfaces 1 and 2. In this embodiment, the second introduction part d2 is a flow path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and second processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate a force (hereinafter "surface-approaching pressure") to press the first processing surface 1 of the first processing member 10 and the second processing surface 2 of the second processing member 20 in the direction to make them approach to each other. By the balance between this surface-approaching pressure and the force to separate the processing surfaces 1 and 2 from each other, i.e., the force such as the fluid pressure, a thin film fluid having minute thickness in a level of nanometer or micrometer is generated. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both of the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, to the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the depression may be continuous, intermittent, or branched. In addition, this depression 13 may be formed also on the second processing surface 2, or on both of the first and second processing surfaces 1 and 2. By forming the depression 13 as mentioned above, the micro-pump effect can be obtained so that the fluid to be processed may be sucked into between the first and second processing surfaces 1 and 2.

The base end of the depression 13 reaches preferably inner circumference of the first processing member 10. The front end of the depression 13 extends in an outer circumferential direction of the first processing surface 1 with the depth thereof (cross-sectional area) being gradually shallower as going from the base end toward the front end.

Between the front end of the depression 13 and the outer periphery of the first processing surface 1 is arranged a flat surface 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating nanosized microparticles (nanoparticles) from a fluid, it is preferable that mixing of a plurality of fluids to be processed and separation of the nanoparticles therefrom be effected under the condition of a laminar flow.

This second introduction part d2 may have directionality. For example, as shown in FIG. 3(A), the direction of introduction from the opening d20 of the second processing surface 2 is inclined at a predetermined elevation angle ($\theta1$) relative to the second processing surface 2. The elevation angle ($\theta1$) is set at more than 0° and less than 90°, and when the reaction speed is high, the angle ($\theta1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta2$) exists facing the rotation direction R from a reference line g, which is the line to the outward direction and in the radial direction passing through the opening d20. This angle ($\theta2$) is also set preferably at more than 0° and less than 90°.

This angle ($\theta2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening of the introduction part may be arranged just before the first and second processing surfaces 1 and 2 or in the side of further upstream thereof.

In the apparatus mentioned above, treatment such as separation and deposition, or crystallization takes place under a forced and uniform mixing between the processing surfaces 1 and 2 arranged opposite to each other so as to be able to approach to and separate from each other, at least one of which rotates relative to the other, as shown in FIG. 1. A particle diameter and mono-dispersibility of the copper phthalocyanine microparticles can be controlled by appropriately controlling rotation number of the processing members 10 and 20, fluid velocity, distance between the processing surfaces, raw material concentration, dispersion medium, and so on.

Hereinafter, the reaction of production of copper phthalocyanine microparticles in the present invention is described in more detail.

First, a fluid containing a solvent capable of being a poor solvent to a copper phthalocyanine is introduced as a first fluid through one flow path, that is, the first introduction part d1, into the space between the processing surfaces 1 and 2 arranged to be opposite to each other so as to be able to approach to and separate from each other, at least one of which rotates relative to the other, thereby forming a thin film fluid comprised of the first fluid between the processing surfaces.

Then, from the second introduction part d2 which is a separate flow path is introduced, as the second fluid, a fluid containing a copper phthalocyanine solution having a copper phthalocyanine (this is a reaction material) dissolved in a solvent directly into the thin film fluid formed by the first fluid. Meanwhile, of the first fluid and the second fluid, in at least any one of them is contained an organic solvent generally capable of transforming a crystal type of a copper phthalocyanine to other than the α-type crystal (this solvent will be mentioned later).

As described above, the first fluid and the second fluid are instantly mixed with maintaining a state of a ultrathin film between the processing surfaces 1 and 2, the distance of which is regulated by the pressure balance between the supply pressure of the fluids and the pressure exerted between the rotating processing surfaces, thereby enabling to carryout the reaction producing the copper phthalocyanine microparticles.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

A combination of the first fluid and the second fluids is not particularly restricted; a fluid which contains a copper phthalocyanine solution having a copper phthalocyanine dissolved in a solvent and a fluid which contains a solvent capable of being a poor solvent to the copper phthalocyanine may be used. The solvent capable of being a poor solvent to a copper phthalocyanine is defined as that this solvent is capable of being a poor solvent which has lower solubility to a copper phthalocyanine than the solvent of the copper phthalocyanine solution in which a copper phthalocyanine is dissolved.

As mentioned above, the third introduction part d3, in addition to the first introduction part d1 and the second introduction part d2, may also be arranged in the processing apparatus. In this case, for example, the foregoing fluids including the organic solvent may be introduced separately as the first fluid, the second fluid, and the third fluid into the processing apparatus through respective introduction parts. By so doing, concentration and pressure of each solution can be controlled separately so that the separation reaction and stabilization of a particle diameter of the nanoparticles can be controlled more precisely. Meanwhile, a combination of fluids to be processed (first to third fluids) may be arbitrarily chosen. So are the cases of arranging introduction parts more than third introduction part, whereby the fluids to be introduced into the processing apparatus can be fragmented. In this case, the foregoing organic solvent may be contained at least in the third fluid, while it may be contained in at least either one of the first fluid or the second fluid, or not contained in both the first fluid and the second fluid. In addition, temperatures of the fluids to be processed, i.e., the first fluid, the second fluid, and so on may be controlled; and temperature difference among the first fluid, the second fluid, and so on may be controlled either (namely, temperature difference among each of the introducing fluids to be processed). To control temperature and temperature difference of each of the introducing fluids to be processed, a mechanism to measure the temperatures of each fluid to be processed (temperatures of the fluids in the processing apparatus, or more precisely just before introduction between the processing surfaces 1 and 2), with which the fluids to be processed that are introduced between the processing surfaces 1 and 2 can be heated or cooled, may be added to the apparatus.

For example, a solvent for dissolving copper phthalocyanine is not particularly limited, and in the case of an acidic aqueous solution, for example, sulfuric acid, hydrochloric acid, nitric acid or trifluoroacetic acid can be used. Especially, fuming sulfuric acid, fuming nitric acid, or the like is preferably used when surface-treated copper phthalocyanine microparticles are prepared. Further, amide solvents such as 1-methyl-2-pyrrolidinone, 1,3-dimethyl-2-imidazolidinone, 2-pyrrolidinone, ε-caprolactam, formamide, N-methylformamide, N,N-dimethylformamide, acetamide, N-methylacetamide, N,N-dimethylacetamide, N-methylpropanamide, and hexamethyl phosphoric triamide; dimethyl sulfoxide; pyridine; or their mixture can be used. In addition, a solution having copper phthalocyanine dissolved into various organic solvents that are added with an alkaline or acidic substance may be used as a copper phthalocynine solution. An alkaline substance which is added to the organic solvent includes sodium hydroxide, potassium hydroxide, sodium methoxide, and sodium ethoxide, or the like. An acid substance, as the same described above, includes sulfuric acid, hydrochloric acid, nitric acid, trifluoroacetic acid, phosphoric acid, or the like.

As to the solvent capable of being a poor solvent to separate copper phthalocyanine microparticles, a solvent having lower solubility to the copper phthalocyanine than the solvent into which the copper phthalocyanine has been dissolved. An illustrative example of the solvent like this includes water, an alcohol compound solvent, an amide compound solvent, a ketone compound solvent, an ether compound solvent, an aromatic compound solvent, carbon disulfide, an aliphatic compound solvent, a nitrile compound solvent, a sulfoxide compound solvent, a halogenated compound solvent, an ester compound solvent, a pyridine compound solvent, an ionic liquid solvent, a carboxylic acid compound solvent, a sulfonic acid compound solvent, and a sulfolane compound solvent. These solvents may be used singly or as a mixture of two or more of them.

Among the foregoing solvents, it is preferable that at least one kind of the organic solvent generally capable of transforming a crystal type of the copper phthalocyanine to other than the α-type crystal be contained in any one of the fluid which contains the foregoing solvent capable of being the poor solvent and the fluid which contains the copper phthalocyanine solution or both fluids; or alternatively, this solvent may be contained in a third fluid which is different from any of the fluid which contains a solvent capable of being the poor solvent and the fluid which contains the copper phthalocyanine solution. As to the organic solvent capable of transforming a crystal type of the copper phthalocyanine to other than the α-type crystal, there is no particular restriction; and an illustrative example thereof includes an aromatic compound solvent, a ketone compound solvent, a halogenated compound solvent, an ether compound solvent, an ester compound solvent, an aliphatic compound solvent, and an alcohol compound solvent. Among them, an aromatic compound solvent, an ether compound solvent, a ketone compound solvent, and a halogenated compound solvent, which are fast in the transition rate, are preferable; especially, an aromatic compound solvent and an ether compound solvent are preferable.

There is no particular restriction as to the aromatic compound solvent, and an illustrative example thereof includes benzene, toluene, xylene, mesitylene, styrene, cresol, cumene, nitrobenzene, benzoic acid, salicylic acid, and naphthalene.

There is no particular restriction as to the ether compound solvent, and an illustrative example thereof includes tetrahydrofuran, tetrahydropyran, tetrahydrothiopene, anisole, propylene glycol monomethyl ether, cyclopentyl methyl ether, dimethyl ether, diethyl ether, methyl ethyl ether, dioxane, and propylene carbonate.

There is no particular restriction as to the halogenated compound solvent, and an illustrative example thereof includes dichloromethane, trichloromethane, perchloroethylene, bromopropane, chloroform, trichloroethylene, dichlorobenzene, and trichlorobenzene.

There is no particular restriction as to the ketone compound solvent, and an illustrative example thereof includes acetone, methyl ethyl ketone, methyl isobutyl ketone, DIBK (diisobutyl ketone), cyclohexanone, and DAA (diacetone alcohol).

There is no particular restriction as to the ester compound solvent, and an illustrative example thereof includes ethyl acetate, methyl acetate, butyl acetate, methoxybutyl acetate, cellosolve acetate, amyl acetate, n-propyl acetate, isopropyl acetate, methyl lactate, ethyl lactate, and butyl lactate.

An illustrative example of the alcohol compound solvent includes methanol, ethanol, isopropanol, n-propanol, 1-methoxy-2-propanol, a linear alcohol such as n-butanol, a branched alcohol such as 2-butanol and tert-butanol, a polyhydric alcohol such as ethylene glycol and diethylene glycol, and propylene glycol monomethyl ether.

An illustrative example of the aliphatic compound solvent includes hexane, pentane, octane, and cyclohexane.

In addition, a dispersing agent such as a block copolymer, a macromolecular polymer, and a surfactant may be contained in any one of the fluid which contains a copper phthalocyanine and the fluid which contains a solvent capable of being a poor solvent to this copper phthalocyanine or both fluids. Further, the foregoing dispersing agent may be contained in a third fluid which is different from any of the fluid which contains a solvent capable of being the poor solvent and the fluid which contains the copper phthalocyanine.

As surfactants and dispersants, various commercial products for use in dispersing pigments can be used. The surfactants and dispersants include, but are not limited to, those based on dodecylbenzenesulfonic acid such as sodium dodecyl sulfate or Neogen R-K (Dai-ichi Kogyo Seiyaku Co., Ltd.), Solsperse 20000, Solsperse 24000, Solsperse 26000, Solsperse 27000, Solsperse 28000, and Solsperse 41090 (manufactured by Avecia Corporation), Disperbyk-160, Disperbyk-161, Disperbyk-162, Disperbyk-163, Disperbyk-166, Disperbyk-170, Disperbyk-180, Disperbyk-181, Disperbyk-182, Disperbyk-183, Disperbyk-184, Disperbyk-190, Disperbyk-191, Disperbyk-192, Disperbyk-2000, and Disperbyk-2001 (manufactured by BYK-Chemie), Polymer 100, Polymer 120, Polymer 150, Polymer 400, Polymer 401, Polymer 402, Polymer 403, Polymer 450, Polymer 451, Polymer 452, Polymer 453, EFKA-46, EFKA-47, EFKA-48, EFKA-49, EFKA-1501, EFKA-1502, EFKA-4540, and EFKA-4550 (manufactured by EFKA Chemical Corp.), Flowlen DOPA-158, Flowlen DOPA-22, Flowlen DOPA-17, Flowlen G-700, Flowlen TG-720W, Flowlen-730W, Flowlen-740W, and Flowlen 745W (manufactured by Kyoeisha Chemical Co., Ltd.), Ajisper PA-111, Ajisper PB-711, Ajisper PB-811, Ajisper PB-821, and Ajisper PW-911 (manufactured by Ajinomoto Co. Inc.), Johncryl 678, Johncryl 679, and Johncryl 62 (manufactured by Johnson Polymer B.V., and AQUALON KH-10, HITENOL NF-13 (manufactured by DAI-ICHI KOGYO SEIYAKU CO., LTD.). These products may be used alone or in combination of two or more thereof.

The case of executing surface treatment to copper phthalocyanine microparticles will be explained hereinafter.

Surface treatment by introducing a modification group at least to a surface of copper phthalocyanine microparticles may be done by containing a surface-modification agent into fluids to be processed which are introduced between the processing surfaces 1 and 2. The surface-modification agent may be contained in any one of the fluid which contains a copper phthalocyanine (first fluid) and the fluid which contains a solvent capable of being a poor solvent to this copper phthalocyanine (second fluid) or both fluids; or alternatively, the surface-modification agent may be contained in a third fluid which is different from any of the fluid which contains a solvent capable of being the poor solvent and the fluid which contains the copper phthalocyanine. Here, combination of the first fluid and the second fluid is not particularly limited to the above example.

A kind of the modification group to be introduced as a surface-modification agent to at least the pigment surface is not particularly restricted; in the case that purpose of the surface treatment is to improve dispersibility, the modification group may be selected in accordance with, for example, a solvent for intended dispersion and kind of a dispersing agent. An example of the modification group includes those having a polar group such as an acidic group and a basic group, a salt structure of the foregoing polar groups, any one of a highly polar atom such as oxygen and sulfur and a highly polarizability structure introduced with an aromatic ring and the like or both, a hydrogen-bonding group, a hetero-ring, and an aromatic ring. An example of the acidic group includes a hydroxyl group (a hydroxy group), a sulfonic acid group (a sulfo group), a carboxylic acid group, a phosphoric acid group, and a boric acid group. An example of the basic group includes an amino group. An example of the hydrogen-bonding group includes a urethane moiety, a thiourethane moiety, a urea moiety, and a thiourea moiety.

In the case that purpose of the surface treatment is other than to improve dispersibility, for example, in the case that a surface of the copper phthalocyanine microparticles is made water-repellent, lipophilic, or compatible with an organic solvent, the surface of the copper phthalocyanine microparticles discharged from between the processing surfaces 1 and 2 may be made lipophilic by containing a surface-modifying agent having a lipophilic functional group in any one of the first fluid and the second fluid or both so that the lipophilic functional group may be introduced as the modification group. Further, the foregoing surface-modification agent may be contained in a third fluid which is different from any of the first fluid and the second fluid.

In the case that a surface of the copper phthalocyanine microparticles is subjected to the treatment of attaching a resin as the surface-modifying agent, at least a part of a surface of the copper phthalocyanine microparticles discharged from between the processing surfaces 1 and 2 may be covered with the resin by containing the resin in any one of the first fluid and the second fluid or both, whereby carrying out, for example, a hydrophilic treatment. Further, the foregoing resin may be contained in a third fluid which is different from any of the first fluid and the second fluid.

The foregoing surface treatment is not limited to the case in which surface modification of the copper phthalocyanine microparticles is done between the processing surfaces 1 and 2 as mentioned above; but also it may be done after discharge of the copper phthalocyanine microparticles from between the processing surfaces 1 and 2. In the latter case, after the fluid which contains the copper phthalocyanine microparticles is discharged from between the processing surfaces 1 and 2, a material to be used for surface treatment of the copper phthalocyanine microparticles is added into this discharged fluid; and then, the surface treatment of the copper phthalocyanine microparticles may be done by such procedure as stirring. Alternatively, after the fluid which contains the copper phthalocyanine microparticles is discharged, impure materials are removed by a dialysis tube or the like from the fluid which contains the copper phthalocyanine microparticles, and then, the surface treatment may be done by adding a material for the surface treatment. Further, the surface treatment may be done after the copper phthalocyanine microparticles are made to powders by drying the liquid component of the fluid discharged from between the processing surfaces 1 and 2, the fluid containing the copper phthalocyanine microparticles. Specifically, after the obtained powders of the copper phthalocyanine microparticles are dispersed in an intended solvent, a material for the surface treatment is added to the resulting dispersion solution, and then, the surface treatment may be done by such procedure as stirring.

A method for producing copper phthalocyanine microparticles in the present invention (the forced ultrathin film rotary reaction method) can freely change the Reynolds number of its minute flow path and can thus form copper phthalocyanine microparticles which are monodisperse and excellent in re-dispersibility, having an objective particle size, particle shape and crystal form. By their self-dischargeability, there is no clogging with products even in a reaction accompanied by separation, and a large pressure is not necessary. Accordingly, the method in the present invention is superior in safety, hardly mixed in with impurities, excellent in washing performance, thus can stably produce copper phthalocyanine microparticles. In addition, the method can be scaled up depending on the intended amount of production, thus can provide a highly productive method for producing copper phthalocyanine pigment microparticles.

A copper phthalocyanine pigment according to the present invention relates to a blue color, and it can be used in a wide range for, for example, a coating material, an inkjet ink, a thermal transfer ink, a toner, a colored resin, and a color filter.

EXAMPLES

Hereinafter, Examples of producing a copper phthalocyanine microparticle wherein a crystal type of the copper phthalocyanine microparticle is different from the α-type crystal with an absorption spectrum in 380 nm to 780 nm being of an absorption spectrum form of the α-type crystal and the wavelength (λmax) to give the maximum transmittance in 380 nm to 780 nm of its transmission spectrum being shorter than 478 nm by using an apparatus based on the same principle as disclosed in the Patent Document 3 filed by the Applicant of the present invention. However, the present invention is not limited to the following Examples.

By using the apparatus wherein stirring and mixing are done in a thin film fluid formed between the processing surfaces 1 and 2 which are disposed in a position they are faced with each other so as to be able to approach to and separate from each other, at least one of which rotates relative to the other, a copper phthalocyanine solution having a copper phthalocyanine dissolved in a solvent and a solvent capable of being a poor solvent to the copper phthalocyanine are mixed to separate copper phthalocyanine microparticles in the thin film fluid. At this time, of the copper phthalocyanine solution and the solvent capable of being a poor solvent to the copper phthalocyanine, in at least any one of them is contained an organic solvent generally capable of transforming a crystal type of the copper phthalocyanine to other than the α-type crystal.

In the following examples, the term "from the center" means "through the first introduction part d1" in the processing apparatus shown in FIG. 1, the first fluid refers to the first processed fluid, and the second fluid refers to the second processed fluid introduced "through the second introduction part d2" in the processing apparatus shown in FIG. 1. Additionally, "part" indicates "parts by weight" in this context.

(Volume-Average Particle Size)

Particle size distribution was measured by using a particle size distribution measuring instrument (trade name: Nanotrac UPA-UT151, manufactured by Nikkiso Co., Ltd.), and the volume-average particle size was adopted.

(Powder X-Ray Diffraction: XRD)

Powder X-ray Diffraction was measured by a full-automatic multipurpose X-ray diffraction instrument (trade name: X'Pert PRO MPD, manufactured by PANalytical B.V.). Diffraction intensity was measured within a range of diffractin angle 2 theta=5 degree to 60 degree.

(Absorption Spectrum and Transmission Spectrum)

Absorption spectrum or transmission spectrum in the wavelength range of 380 nm to 780 nm was measured with a UV visible spectrophotometer UV-2450 (manufactured by Shimadzu Corp.). A criterion of the characteristic that an absorption spectrum of a copper phthalocyanine is of an absorption spectrum form of the α-type crystal is based on that the absorption spectrum thereof is the same as the absorption spectrum form of a general α-type copper phthalocyanine. As mentioned above, in the copper phthalocyanine of the present invention, that the absorption spectrum is of an absorption spectrum form of the α-type means that the absorption spectrum thereof has its peak in the range of 600±15 nm to 680±15 nm in the wavelength range of 380 nm to 780 nm.

Examples 1 to 6

In example 1, a mixed solvent of m-xylene and ethylene diamine having temperature of 25° C. was introduced as the first fluid from the center into between the processing surfaces 1 and 2 with supply pressure of 0.30 MPaG and rotation number of 1700 rpm, together with, as the second fluid, a copper phthalocyanine solution having the β-type copper phthalocyanine dissolved in a mixed solvent of trifluoroacetic acid and dichloromethane (the crystal type was confirmed with a powder X-ray diffraction instrument). A dispersion solution of the copper phthalocyanine microparticles was discharged from between the processing surfaces 1 and 2. The discharged copper phthalocyanine microparticles were loosely aggregated and spun down by centrifugal separation (×26000 G). Supernatant after centrifugal separation was removed; and then, after the copper phthalocyanine microparticles were floated again by adding a mixed solvent of pure water and isopropyl alcohol, centrifugal separation was repeated to wash the copper phthalocyanine microparticles. A finally obtained paste of the copper phthalocyanine microparticles was dried at 30° C. under vacuum of −0.1 MPa. XRD of powders of the copper phthalocyanine microparticles after drying was measured. These powders were dispersed in a solution having m-xylene dissolved in as a dispersing agent Disperbyk BYK-2146 (manufactured by BYK-Chemie GmbH). The dispersion solution of the copper phthalocyanine microparticles was subjected to measurement of a particle diameter distribution thereof by using m-xylene as a solvent. A part of the dispersion solution of the copper phthalocyanine microparticles in m-xylene was diluted by m-xylene; and then, transmission spectrum of the dispersion solution of the copper phthalocyanine microparticles with concentration thereof being 0.005% by weight and absorption spectrum of the dispersion solution thereof with concentration thereof being 0.001% by weight were measured.

Figure 9:
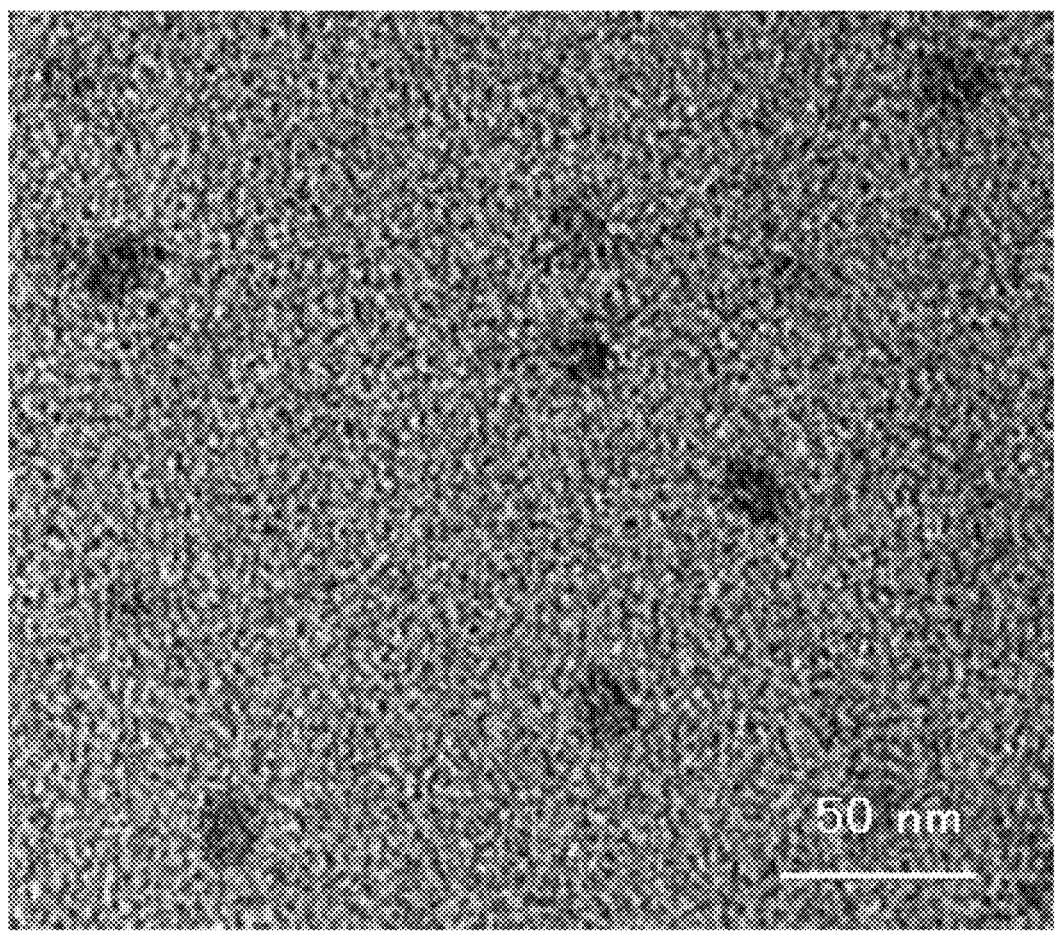
FIG. 9 shows a TEM picture of the copper phthalocyanine microparticles prepared in Example 1 of the present invention.

In Examples 2 to 6, kinds of the first and second fluids, rotation number, temperature of the supplied solution (temperature just before introduction of respective fluids into the processing apparatus), and introducing speed (flow amount) (unit: mL/minute) were changed as shown in Table 1. In the present Examples (Examples 1 to 6), as the solvent capable of being a poor solvent to the copper phthalocyanine, organic solvents generally capable of transforming a crystal type of the copper phthalocyanine to other than the α-type crystal were used. In FIG. 4, an absorption spectrum of a dispersion solution of the copper phthalocyanine microparticles prepared in Example 1 is shown (solid line), and in FIG. 5, a transmission spectrum of a dispersion solution of the copper phthalocyanine microparticles prepared in Example 1 is shown (solid line); and in FIGS. 6 to 8, powder X-ray diffraction spectra of the copper phthalocyanine microparticles prepared in Example 1 (FIG. 6), Example 6 (FIG. 7) and Example 5 (FIG. 8) are respectively shown. To compare spectrum forms of dispersion solutions of the respective copper phthalocyanine microparticles prepared in these Examples, an absorption spectrum (shown by a solid line with open circles) and a transmission spectrum (shown by a solid line with open circles) of the copper phthalocyanine pigment which contains the α-type copper phthalocyanine with the wavelength (λmax) to give the maximum transmittance in 380 nm to 780 nm of its transmission spectrum being shorter than 478 nm, which is provided by the Applicant of the present invention in the Patent Document 3, are shown in FIGS. 4 and 5. In addition, XRD measurement result, a volume-average particle diameter, wavelength (λmax) to give the maximum transmittance in 380 nm to 780 nm of its transmission spectrum, form of its absorption spectrum in 380 nm to 780 nm, and a peak position of its absorption spectrum in 380 nm to 780 nm, of the respective copper phthalocyanine microparticles or the dispersion solutions thereof prepared in Examples 1 to 6 are shown in Table 1. Further, a TEM picture of the copper phthalocyanine microparticles prepared in Example 1 is shown in FIG. 9. It can be seen that a form of the obtained copper phthalocyanine is almost spherical. As can be seen in Table 1 and FIGS. 4 to 8, provided in the present invention were: a copper phthalocyanine pigment containing copper phthalocyanine microparticles having a crystal type different from the α-type crystal with the absorption spectrum form thereof in 380 nm to 780 nm being of the absorption spectrum form of the α-type crystal; a copper phthalocyanine pigment containing copper phthalocyanine microparticles having a crystal type different from two kinds of the α-type crystal and the ε-type crystal with the wavelength (λmax) to give the maximum transmittance in 380 nm to 780 nm of its transmission spectrum being shorter than 478 nm; and a method for producing the foregoing copper phthalocyanine microparticles. That is, the copper phthalocyanine pigment containing at least one kind of copper phthalocyanine microparticle having the crystal type different from the α-type crystal with the spectroscopic characteristics thereof being equivalent to those of the α-type crystal proposed in the Patent Document 3 while having better solvent resistance than the α-type crystal, and a method for producing the foregoing copper phthalocyanine microparticles could be provided. Further, the copper phthalocyanine microparticles, which constitutes the copper phthalocyanine pigment, having the volume-average particle diameter thereof being 1 nm to 600 nm with the crystal type different from the α-type crystal and with the particle diameter being controlled could be prepared; and thus, expression of the characteristics such as intended color tone and coloring power can be expected.

TABLE 1

| | | First fluid | | | Second fluid | | |
|---|---|---|---|---|---|---|---|
| Example | Rotation number (rpm) | Solvent | Flow rate (mL/min) | Temperature (° C.) | Solvent | Flow rate (mL/min) | Temperature (° C.) |
| 1 | 1700 | 0.5% Ethylenediamine/ m-xylene | 400 | 25 | 1% Copper phthalocyanine/ (28% trifluoro- acetic acid/72% dichloromethane) | 3 | 25 |
| 2 | 1700 | 1% Ethylenediamine/ m-xylene | 400 | 25 | | 3 | 25 |
| 3 | 1700 | m-Xylene | 400 | 117 | | 3 | 40 |
| 4 | 1700 | Tetrahydrofuran | 400 | 25 | | 3 | 66 |
| 5 | 3600 | Tetrahydrofuran | 1000 | 25 | | 30 | 25 |
| 6 | 3600 | 1% Copper phthalocyanine/ (28% trifluoro- acetic acid/72% dichloromethane) | 400 | 25 | Tetrahydrofuran | 50 | 25 |

| | XRD measurement | Particle diameter measurement result Volume-average | Absorption spectrum | | | Transmission spectrum λmax (nm) |
|---|---|---|---|---|---|---|
| | | | | Peak wavelength (nm) | | |
| Example | Crystal type (Type) | particle diameter (nm) | Form (Type) | Short wave- side | Long wave- side | |
| 1 | β | 8.6 | α | 604 | 672 | 465 |
| 2 | β | 38.6 | α | 603 | 676 | 466 |
| 3 | β | 107.6 | α | 600 | 672 | 468 |
| 4 | β | 563.4 | α | 610 | 686 | 476 |
| 5 | ε | 121.4 | α | 612 | 695 | 470 |
| 6 | γ | 328.6 | α | 609 | 694 | 475 |

EXPLANATION OF REFERENCE NUMERALS

1 first processing surface
2 second processing surface
10 first processing member
11 first holder
20 second processing member
21 second holder
23 separation-regulating surface
d1 first introduction part
d2 second introduction part
d20 opening
p fluid pressure imparting mechanism

The invention claimed is:
1. A copper phthalocyanine pigment containing copper phthalocyanine microparticles containing at least one kind of copper phthalocyanine microparticles whose crystal type is any of two kinds of β- and γ-type crystals, wherein a wavelength (λmax) to give the maximum transmittance in

380 nm to 780 nm of a transmission spectrum of the copper phthalocyanine microparticles is less than 478 nm, wherein an absorption spectrum of the copper phthalocyanine microparticles in 380 nm to 780 nm is an absorption spectrum form of an α-type crystal, and wherein the copper phthalocyanine microparticles are formed by a process comprising:

a fluid to be processed is supplied between processing surfaces being capable of approaching to and separating from each other and displacing relative to each other, pressure of force to move in the direction of approaching is balanced with pressure of force to move in the direction of separation thereby keeping a minute space in the distance between the processing surfaces, wherein the pressures of force include supply pressure of the fluid to be processed and pressure applied between the processing surfaces, at least one of which rotates relative to the other, the minute space kept between two processing surfaces is used as a flow path of the fluid to be processed, thereby forming a thin film fluid of the fluid to be processed, forming the copper phthalocyanine microparticles in this thin film fluid, wherein the fluid to be processed is at least two kinds of fluids to be processed including a copper phthalocyanine solution having a copper phthalocyanine dissolved in a solvent and a solvent capable of being a poor solvent to the copper phthalocyanine, and wherein the copper phthalocyanine solution is a solution having copper phthalocyanine dissolved in an organic solvent that is added with an acidic substance, and wherein the solvent capable of being the poor solvent to the copper phthalocyanine is one solvent selected from the group consisting of a mixed solvent of an aromatic compound solvent and ethylene diamine, an aromatic compound solvent, and an ether compound solvent.

2. The copper phthalocyanine pigment containing copper phthalocyanine microparticles according to claim 1, wherein a volume-average particle diameter of the copper phthalocyanine microparticles is in the range of 1 nm to 600 nm.

3. The copper phthalocyanine pigment containing copper phthalocyanine microparticles according to claim 1, wherein the copper phthalocyanine solution is a solution having copper phthalocyanine having β-type crystal dissolved in a mixed solvent of trifluoroacetic acid and dichloromethane, and the solvent capable of being the poor solvent to the copper phthalocyanine is one selected from the group consisting of a mixed solvent of m-xylene and ethylene diamine, m-xylene and tetrahydrofuran.

4. The copper phthalocyanine pigment containing copper phthalocyanine microparticles according to claim 1, wherein the wavelength (λmax) to give the maximum transmittance in 380 nm to 780 nm of a transmission spectrum of the copper phthalocyanine microparticles is less than 478 nm and more than or equal to 465 nm.

5. A method for producing copper phthalocyanine microparticles, the method to produce the copper phthalocyanine microparticles according to claim 1, wherein:

a fluid to be processed is supplied between processing surfaces being capable of approaching to and separating from each other and displacing relative to each other, pressure of force to move in the direction of approaching, including supply pressure of the fluid to be processed and pressure applied between the rotating processing surfaces, is balanced with pressure of force to move in the direction of separation thereby keeping a minute space in the distance between the processing surfaces, the minute space kept between two processing surfaces is used as a flow path of the fluid to be processed, thereby forming a thin film fluid of the fluid to be processed, and the copper phthalocyanine microparticle is separated in this thin film fluid.

6. The method for producing copper phthalocyanine microparticles according to claim 5, wherein:

at least three fluids to be processed, comprising a first fluid, a second fluid, and a third fluid, are used, wherein the first fluid to be processed is a copper phthalocyanine solution having a copper phthalocyanine dissolved in a solvent, the second fluid to be processed is a solvent capable of being a poor solvent to the copper phthalocyanine, and the third fluid to be processed contains at least one kind of organic solvent, wherein all of the fluids to be processed are mixed in the thin film fluid.

7. The method for producing copper phthalocyanine microparticles according to claim 5, wherein:

at least two fluids to be processed are used, at least one of the fluids to be processed is a copper phthalocyanine solution having a copper phthalocyanine dissolved in a solvent, and at least one of the fluids to be processed other than the above fluid is a solvent capable of being a poor solvent to the copper phthalocyanine, at least one of the fluids to be processed out of the copper phthalocyanine solution and the solvent capable of being a poor solvent to the copper phthalocyanine contains at least one kind of an organic solvent, and the fluids to be processed are mixed in the thin film fluid.

8. The method for producing copper phthalocyanine microparticles according to claim 7, wherein the organic solvent contains at least one solvent out of an aromatic compound solvent, a ketone compound solvent, an ether compound solvent, and a halogenated compound solvent.

9. The method for producing copper phthalocyanine microparticles according to claim 5, wherein the method comprises:

a fluid pressure imparting mechanism for imparting a pressure to the fluid to be processed, at least two processing members of a first processing member and a second processing member, the second processing member being capable of relatively approaching to and separating from the first processing member, and a rotation drive mechanism for rotating the first processing member and the second processing member relative to each other; wherein each of the processing members is provided with at least two processing surfaces of a first processing surface and a second processing surface disposed in a position they are faced with each other, each of the processing surfaces constitutes part of a sealed flow path through which the fluid to be processed under the pressure is passed, of the first and second processing members, at least the second processing member is provided with a pressure-receiving surface, and at least part of the pressure-receiving surface is comprised of the second processing surface, the pressure-receiving surface receives pressure applied to the fluid to be processed by the fluid pressure imparting mechanism thereby generating a force to move in the direction of separating the second processing surface from the first processing surface, the fluid to be processed under the pressure is passed between the first and second processing surfaces being capable of approaching to and separating from each other and rotating relative to each other, whereby the fluid to be processed forms the thin film fluid, and the copper phthalocyanine microparticles are separated in this thin film fluid.

10. The method for producing copper phthalocyanine microparticles according to claim 9, wherein:

one kind of fluid to be processed is introduced to between the first processing surface and the second processing surface, an another independent introduction path for another kind of fluid to be processed other than the one kind of the fluid to be processed is provided, at least one opening leading to this introduction path is arranged in at least either one of the first processing surface or the second processing surface, the another kind of the fluid to be processed is introduced between both the processing surfaces through this introduction path, and the one kind of the fluid to be processed and the another kind of the fluid to be processed are mixed in the thin film fluid.

11. The method for producing copper phthalocyanine microparticles according to claim 10, wherein:

the opening is arranged in the downstream side of the point at which the one kind of the fluid to be processed becomes a laminar flow between both the processing surfaces, and mixing of the fluids to be processed is done by introducing the another kind of the fluid to be processed from the opening.

* * * * *